3,445,510
Patented May 20, 1969

3,445,510
DIBENZYL AMMONIUM SALT OF DIBENZYL THIOLCARBAMIC ACID
Philip Bernstein, Yardley, Pa., assignor to Thiokol Chemical Corporation, Bristol, Pa., a corporation of Delaware
No Drawing. Filed Dec. 30, 1965, Ser. No. 517,814
Int. Cl. C07c *155/06*
U.S. Cl. 260—501.12    1 Claim

ABSTRACT OF THE DISCLOSURE

The reaction of carbonyl sulfide with dibenzylamine produces a novel compound having anthelmintic properties and having the structure:

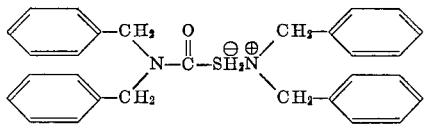

---

This invention relates to a novel salt of thiolcarbamic acid, and more particularly to the dibenzyl ammonium salt of dibenzylthiolcarbamic acid also called dibenzyl ammonium dibenzylthiolcarbamate. This compound is prepared by reacting carbonyl sulfide with dibenzyl amine. This compound has the following structure:

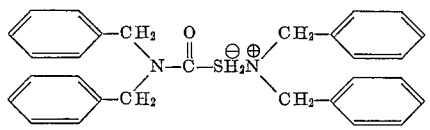

It is an object of the present invention to provide a novel compound having anthelmintic properties. It is a further object of the present invention to provide a novel process for producing this compound.

The dibenzyl ammonium dibenzylthiolcarbamate is useful for its ability to expel or destroy certain parasitic worms frequently found in the intestines of cattle, for example Haemonchus spp., Trichostrongylus spp. and Cooperia spp. Therefore, the dibenzylcarbamate compound of the present invention is useful for decontaminating farm buildings or other facilities which are contaminated with the above-mentioned parasitic worms. The dibenzylcarbamate compound of this invention may also be used for deworming of cattle or other animals which are afflicted with the above-named parasitic worms.

The novel dibenzylcarbamate compound of this invention is prepared by the reaction of carbonyl sulfide with dibenzyl amine at a temperature of from about —15° C. to about 100° C. and preferably from about 0° C. to about 25° C. The reaction is preferably carried out at atmospheric or autogenous pressure; however, the reaction may be conducted over a broad range of pressures. A useful range, however, is from about 5 millimeters of mercury up to about 200 atmospheres. The solvent used in this invention should be an inert solvent, i.e., one that does not substantially interfere with the reaction which is the subject of this invention. Examples of suitable solvents are ethers such as diethyl ether, aliphatic compounds such as hexane, aromatic compounds such as benzene, and esters of carboxylic acids such as diethyl phthalate.

Dibenzyl amine and carbonyl sulfide react in a two to one mol ratio to produce the reaction product of this invention. However, in order to achieve a faster and more complete reaction, it is desirable to use an excess of dibenzyl amine.

The following examples are merely illustrative of the present invention and are not to be considered a limitation upon the scope thereof.

EXAMPLE 1

51 grams of dibenzyl amine is dissolved in 150 milliliters of dimethyl ether. The reaction vessel is maintained at about 5° C. as COS is bubbled through the system. A heavy precipitate of the dibenzyl ammonium salt of dibenzylthiolcarbamate formed. The precipitate is then filtered and thoroughly washed with dimethyl ether. After drying in a vacuum desiccator 45 grams of the product is recovered which has an analysis of 7.07% sulfur and 6.16% nitrogen. The product was a white crystalline material having a melting point of from 65 to 70° C.

EXAMPLE 2

Feces are collected from one to six calves (of the domestic cow) having internal parasite infection. Microscopic inspection thereof yields a combined nematode egg count of 300 or more. The most abundant parasites are Haemonchus spp., Trichostrongylus spp. and Cooperia spp. Ostertagia spp., Esophagostomum spp. and Bunostomum spp. are usually also present. All are infectious parasites naturally occurring among calves.

These fecal samples are thoroughly mixed. 10 grams of the mixture is placed in a paper cup. 15 milligrams of the dibenzyl ammonium dibenzylthiolcarbamate produced by a process as described in Example 1 is added to the mixed fecal sample and thoroughly mixed therein (to yield what hereinafter is called a "medicated sample"). 2 grams of the resulting medicated sample is spread on a gauze pad. 2 grams of the unmedicated fecal mixture is spread on a gauze pad as a control. The two gauze pads are then placed in separate wide mouth glass bottles containing a small amount of water to maintain atmospheric moisture. The bottles are closed and allowed to stand at a temperature of 26–28° C. (a suitable incubation temperature for the nematode species involved) for five days.

At the end of the five day incubation period, the unmedicated sample is examined under a wide field stereoscopic dissecting microscope. Larvae is present in the unmedicated sample and is easily discerned. The medicated sample examined similarly after the 5 day incubation period shows the absence of any larvae.

I claim:
1. A compound having the structure

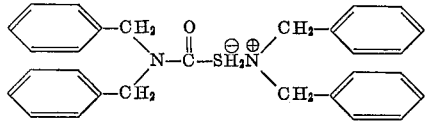

References Cited

UNITED STATES PATENTS 3,133,947    5/1964    Tilles _____ 260—501.12
2,655,534    10/1953    Searle _____ 260—501.12

OTHER REFERENCES

Hagelloch, G. Ber., Jahrg. 83, pp. 258–61 (1950).

LEON ZITVER, *Primary Examiner.*
M. W. GLYNN, *Assistant Examiner.*

U.S. Cl. X.R.
424—286

PO-1050
(5/69)

UNITED STATES PATENT OFFICE
CERTIFICATE OF CORRECTION

Patent No. 3,445,510      Dated May 20, 1969

Inventor(s) Philip Bernstein

It is certified that error appears in the above-identified patent and that said Letters Patent are hereby corrected as shown below:

Column 2, lines 9 and 13, "dimethyl" should read -- diethyl -- .

SIGNED AND
SEALED
APR 7 1970

(SEAL)
Attest:

Edward M. Fletcher, Jr.
Attesting Officer

WILLIAM E. SCHUYLER, JR.
Commissioner of Patents